(12) United States Patent
Zhang et al.

(10) Patent No.: US 12,039,698 B2
(45) Date of Patent: Jul. 16, 2024

(54) IMAGE ENHANCEMENT MODEL TRAINING DATA GENERATION FOR PANORAMIC IMAGES

(71) Applicants: Yupeng Zhang, Beijing (CN); Daojing Li, Beijing (CN); Makoto Odamaki, Kanagawa (JP); Hong Yi, Beijing (CN); Liyan Liu, Beijing (CN); Huan Jia, Beijing (CN); Wei Wang, Beijing (CN)

(72) Inventors: Yupeng Zhang, Beijing (CN); Daojing Li, Beijing (CN); Makoto Odamaki, Kanagawa (JP); Hong Yi, Beijing (CN); Liyan Liu, Beijing (CN); Huan Jia, Beijing (CN); Wei Wang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 240 days.

(21) Appl. No.: 17/629,954

(22) PCT Filed: Aug. 12, 2020

(86) PCT No.: PCT/JP2020/030707
§ 371 (c)(1),
(2) Date: Jan. 25, 2022

(87) PCT Pub. No.: WO2021/029423
PCT Pub. Date: Feb. 18, 2021

(65) Prior Publication Data
US 2022/0253981 A1  Aug. 11, 2022

(30) Foreign Application Priority Data

Aug. 15, 2019 (CN) .................. 201910753276.X

(51) Int. Cl.
*G06T 5/00* (2024.01)
*G06T 5/50* (2006.01)
*G06V 10/774* (2022.01)

(52) U.S. Cl.
CPC .................. *G06T 5/00* (2013.01); *G06T 5/50* (2013.01); *G06V 10/774* (2022.01); *G06T 2207/20081* (2013.01)

(58) Field of Classification Search
CPC .................. G06T 5/00; G06T 3/4076; G06T 2207/20081; G06T 5/60; G06V 10/774
See application file for complete search history.

(56) References Cited

U.S. PATENT DOCUMENTS 8,169,488 B2 * 5/2012 Fujiyama ............... H04N 5/772
   348/36
2016/0127641 A1 * 5/2016 Gove ..................... H04N 23/64
   348/143

(Continued)

FOREIGN PATENT DOCUMENTS

CN     108399600 A     8/2018
CN     108876745 A     11/2018

(Continued)

OTHER PUBLICATIONS

D.-Y. Choi, J.-H. Choi, J. Choi and B. C. Song, "Sharpness Enhancement and Super-Resolution of Around-View Monitor Images," in IEEE Transactions on Intelligent Transportation Systems, vol. 19, No. 8, pp. 2650-2662, Aug. 2018, doi: 10.1109/TITS.2017.2762406. (Year: 2018).*

(Continued)

*Primary Examiner* — Michael Robert Cammarata
(74) *Attorney, Agent, or Firm* — Harness, Dickey & Pierce, P.L.C.

(57) ABSTRACT

Disclosed is an image processing method including steps of obtaining a plurality of sets of training data, each set of training data containing data of first and second images, image quality of the second image being higher than that of the first image, shooting contents of the first image being the same model, letting the data of the first image be an input of (Continued)

the model, and utilizing the plurality of sets of training data to train the model until a difference feature value between an output of the model and the data of the second image is minimum; and inputting data of a third image to be processed into the model so as to output data of a fourth image after image enhancement, image quality of the fourth image being higher than that of the third image.

16 Claims, 16 Drawing Sheets

(56) References Cited

U.S. PATENT DOCUMENTS

| | | | | |
|---|---|---|---|---|
| 2019/0026958 | A1* | 1/2019 | Gausebeck | H04N 13/10 |
| 2019/0333199 | A1* | 10/2019 | Ozcan | G06T 5/70 |
| 2019/0355097 | A1* | 11/2019 | Kamio | H04N 23/12 |
| 2020/0126184 | A1* | 4/2020 | Zhu | G06T 3/4053 |
| 2020/0151858 | A1 | 5/2020 | Cai et al. | |
| 2020/0258196 | A1* | 8/2020 | Kokura | G06T 3/4076 |
| 2021/0014412 | A1* | 1/2021 | Miyatani | H04N 25/702 |
| 2021/0104313 | A1* | 4/2021 | Mizobe | G06T 5/90 |
| 2021/0224957 | A1* | 7/2021 | Iwase | G06V 10/75 |

FOREIGN PATENT DOCUMENTS

| | | | | |
|---|---|---|---|---|
| CN | 108900766 | A | | 11/2018 |
| CN | 109493297 | A | | 3/2019 |
| EP | 3706039 | A1 | * | 9/2020 ............ B07C 3/008 |
| WO | 2019/019086 | | | 1/2019 |
| WO | WO-2019240257 | A1 | * | 12/2019 ........... A61B 3/0025 |

OTHER PUBLICATIONS

A. Zomet and S. Peleg, "Applying super-resolution to panoramic mosaics," Proceedings Fourth IEEE Workshop on Applications of Computer Vision. WACV'98 (Cat. No. 98EX201), Princeton, NJ, USA, 1998, pp. 286-287, doi: 10.1109/ACV.1998.732908. (Year: 1998).*

M. Aggarwal and N. Ahuja, "High dynamic range panoramic imaging," Proceedings Eighth IEEE International Conference on Computer Vision. ICCV 2001, Vancouver, BC, Canada, 2001, pp. 2-9 vol. 1, doi: 10.1109/ICCV.2001.937492. (Year: 2001).*

H. Nagahara, et al., "Super-resolution from an omnidirectional image sequence," 2000 26th Annual Conference of the IEEE Ind. Elec. Society. IECON 2000. 2000 IEEE Intl Conf. on Industrial Electronics, Control and Instrumentation. 21st Century Technologies, Nagoya, Japan, 2000, pp. 2559-2564 vol. 4 (Year: 2000).*

M. D. Doshi, P. P. Gajjar and A. M. Kothari, "Image Super-Resolution Using DWT Based Learning with Zooming Approach," 2018 5th International Conference on Signal Processing and Integrated Networks (SPIN), Noida, India, 2018, pp. 486-491, doi: 10.1109/SPIN.2018.8474257 (Year: 2018).*

G. Zhai and X. Wu, "Video super-resolution for dual-mode digital cameras via scene-matched learning," 2010 IEEE International Workshop on Multimedia Signal Processing, Saint-Malo, France, 2010, pp. 438-442, doi: 10.1109/MMSP.2010.5662061 (Year: 2010).*

Chinese Office Action dated Aug. 31, 2023 issued in corresponding Chinese Patent Application No. 201910753276.X (with English translation).

Junho Jeon et al., "Deep Upright Adjustment of 360 Panoramas Using Multiple Roll Estimations", Advances In Databases And Information Systems, Springer International Publishing Cham, May 26, 2019, pp. 199 to 214.

Bogdan Oleksandr et al., "DeepCalib : A Deep learning Approach for Automatic Intrinsic Calibration of Wide Field-of-View Cameras", Proceedings of the 15th ACM SIGGRAPH European Conference On Visual Media Production, CVMP, Jan. 1, 2018, pp. 1 to 10.

Keisuke Tateno et al., "Distortion-Aware Convolutional Filters for Dense Prediction in Panoramic Images", Advances In Databases And Information Systems, Springer International Publishing Cham, Oct. 6, 2018, pp. 732 to 750.

International Search Report for International Application No. PCT/JP2020/030707 dated Feb. 1, 2021.

Written Opinion for International Application No. PCT/JP2020/030707 dated Feb. 1, 2021.

* cited by examiner

[Fig. 1]
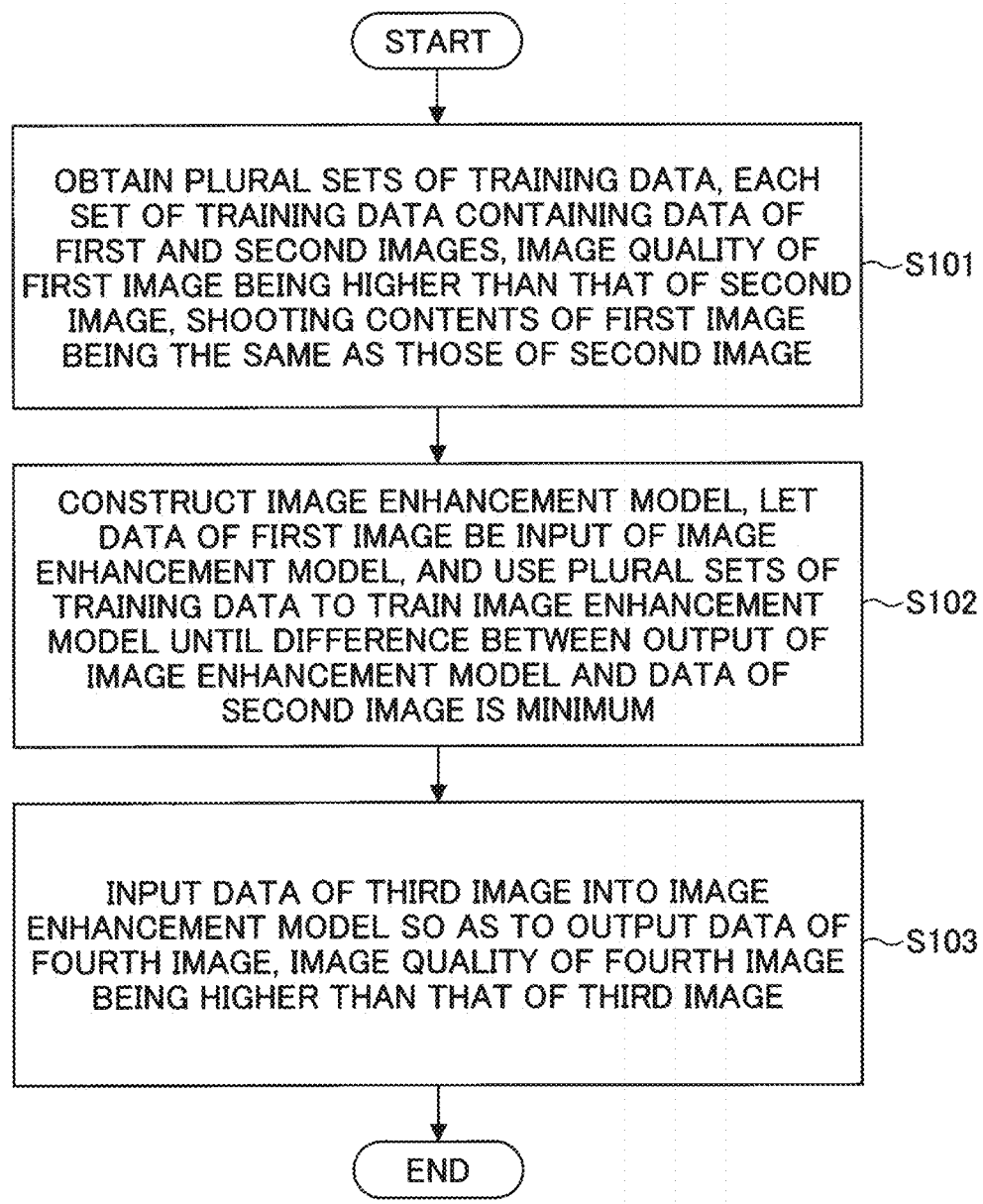

[Fig. 2]
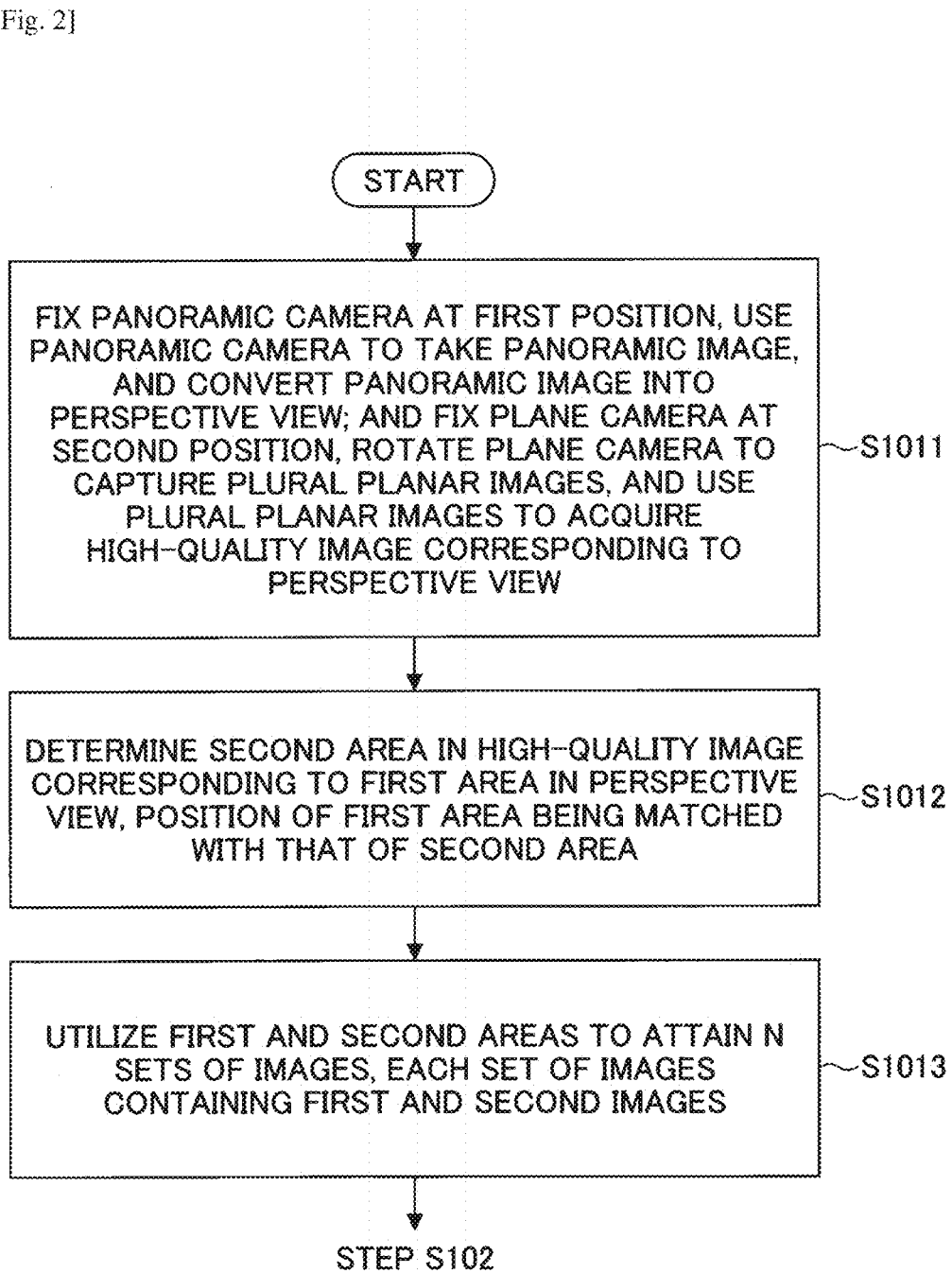

[Fig. 3]
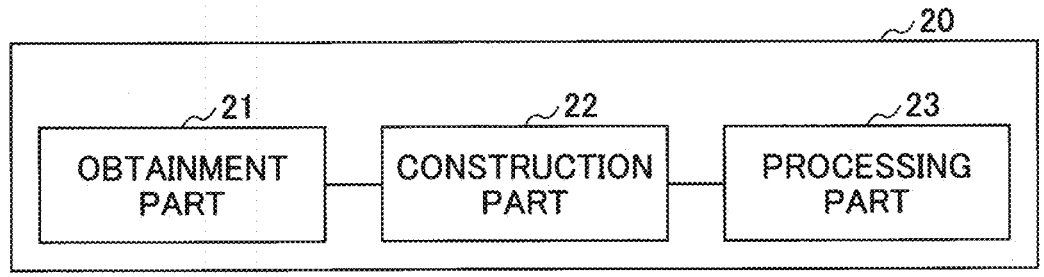
[Fig. 4]
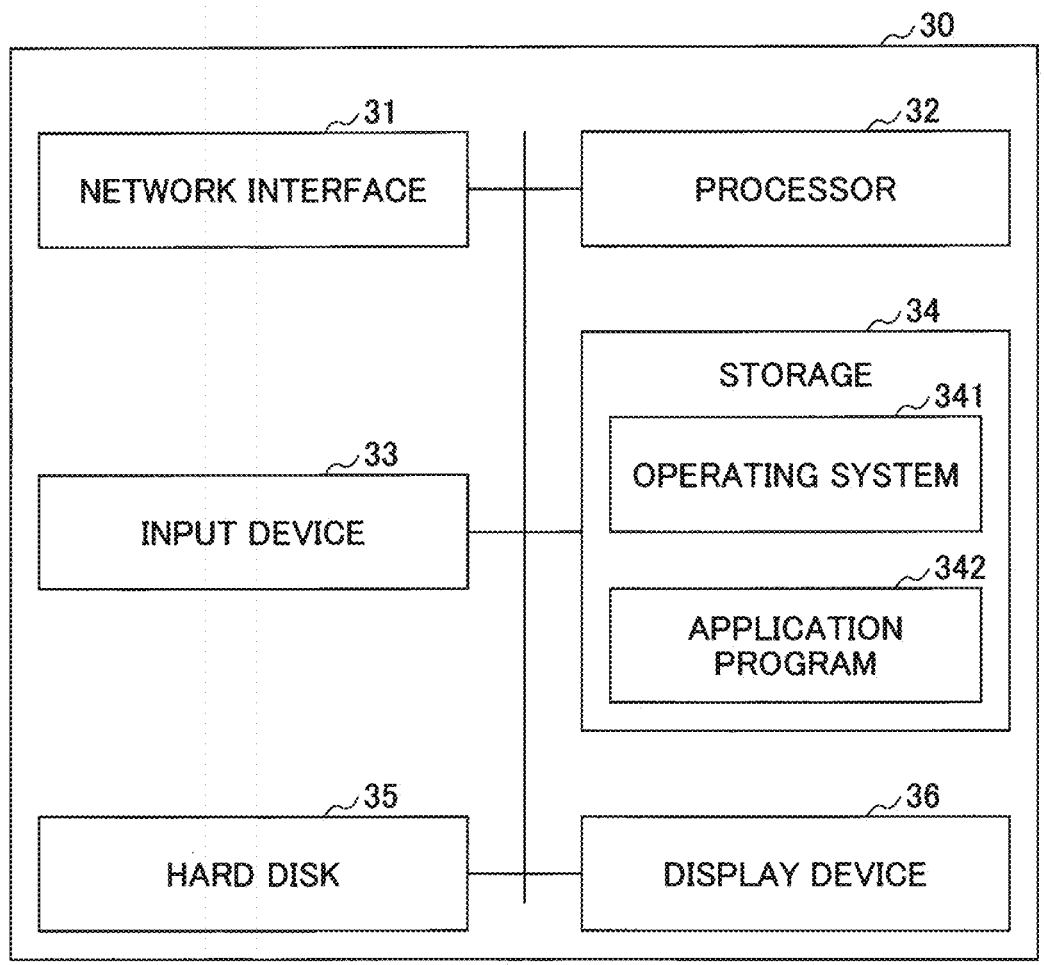

[Fig. 5]
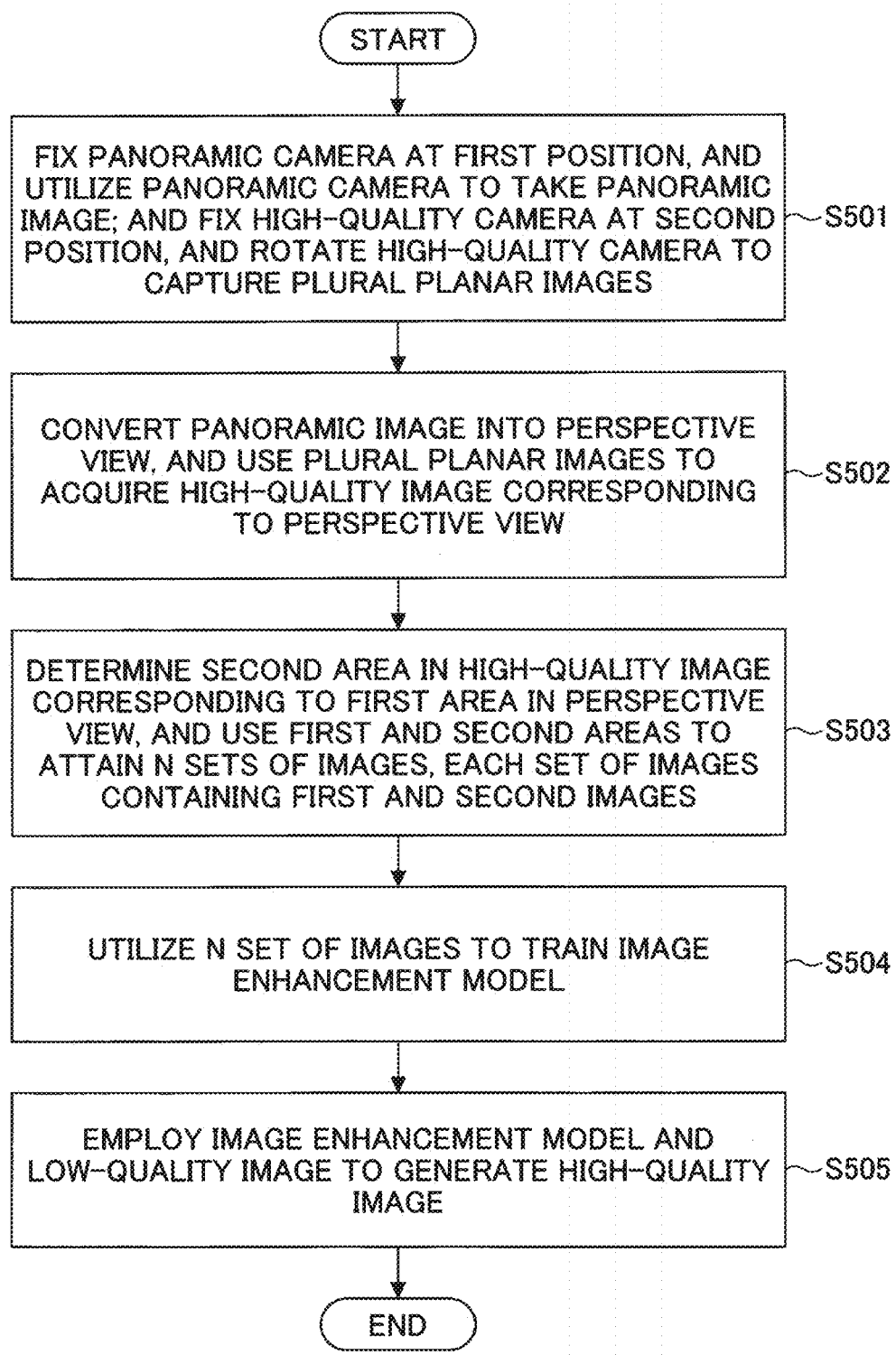

[Fig. 6]
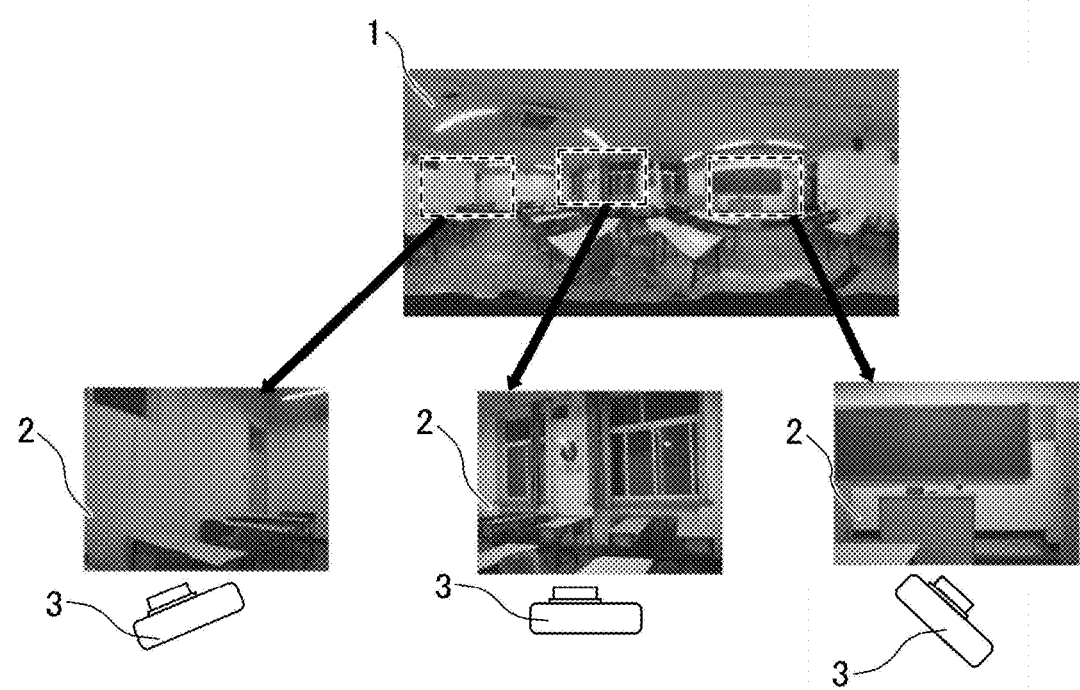

[Fig. 7]
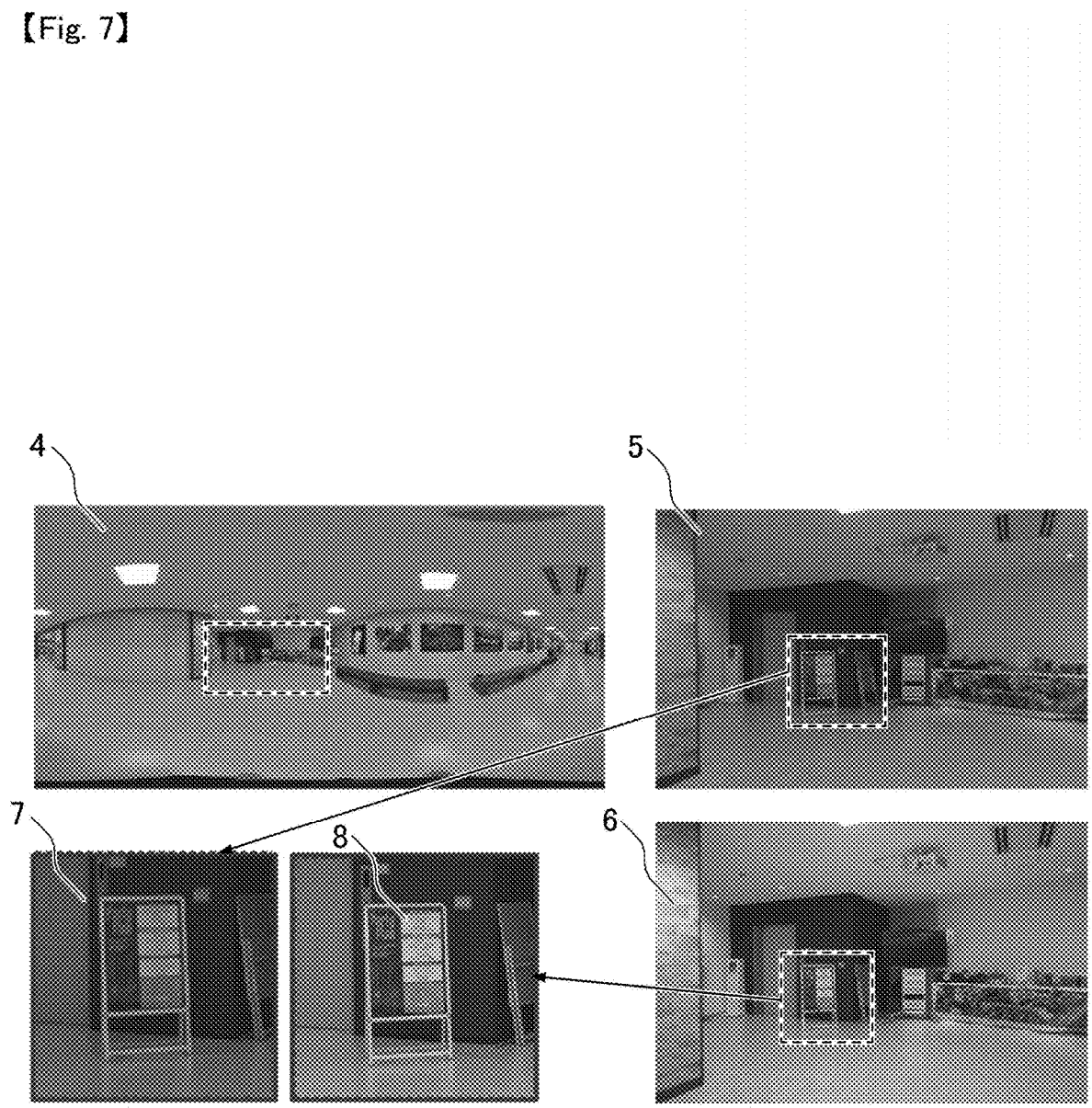

[Fig. 8]
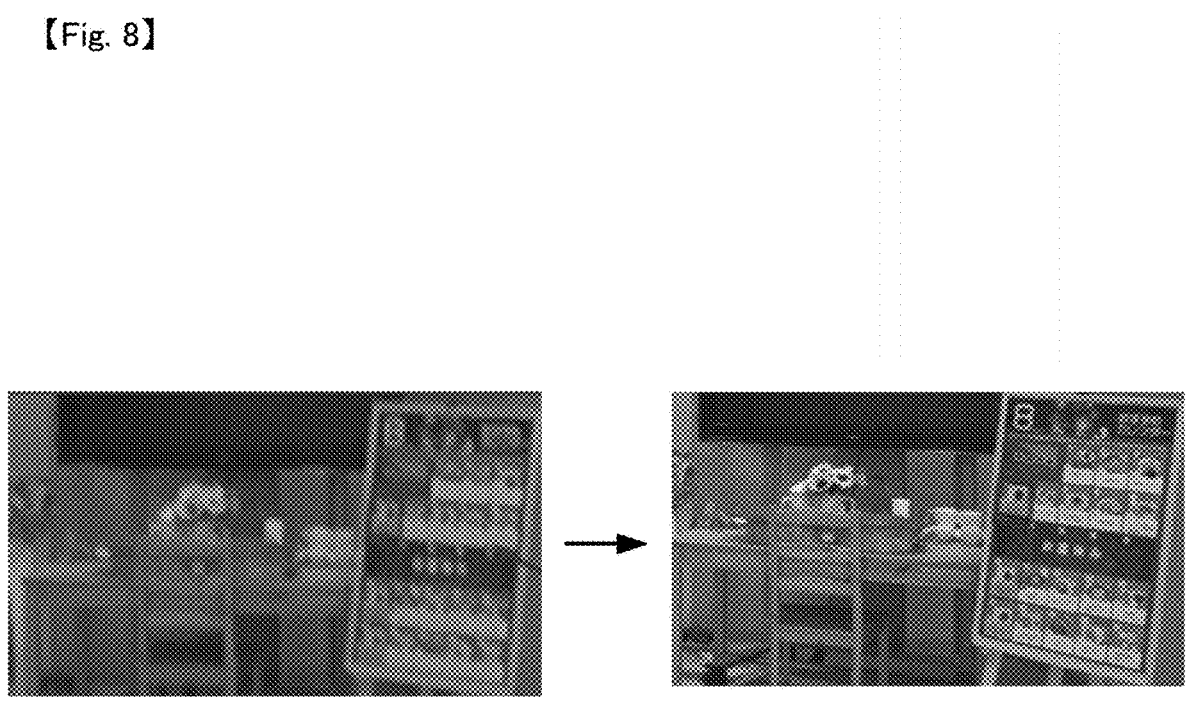

[Fig. 9]
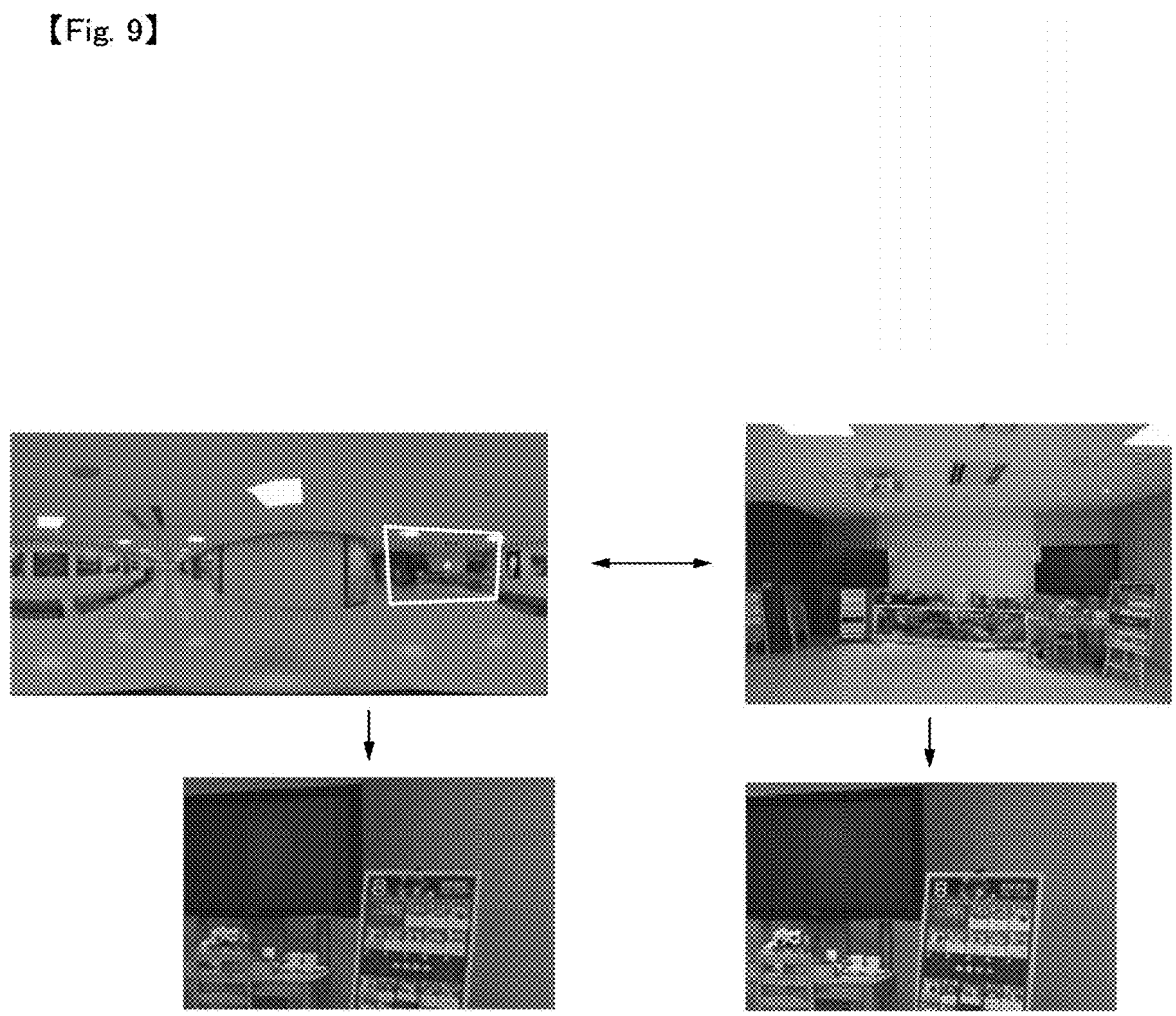

[Fig. 10]
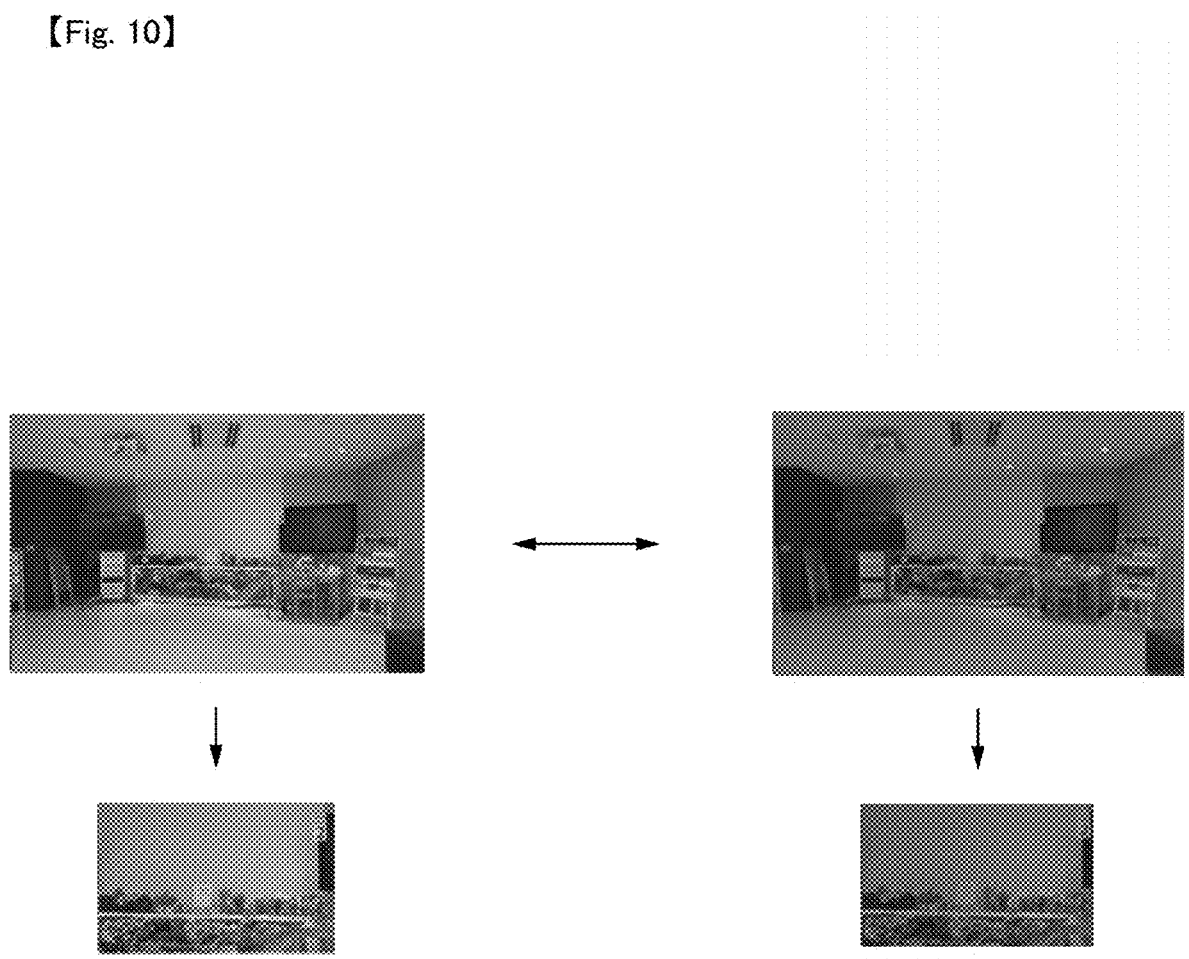

[Fig. 11A]
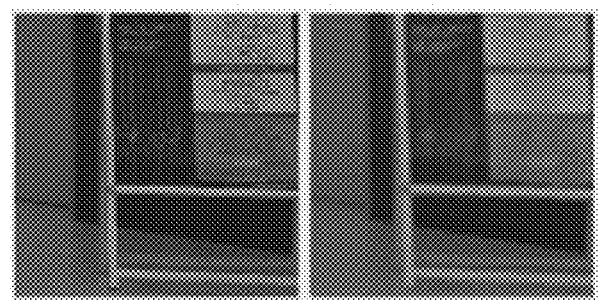

[Fig. 11B]
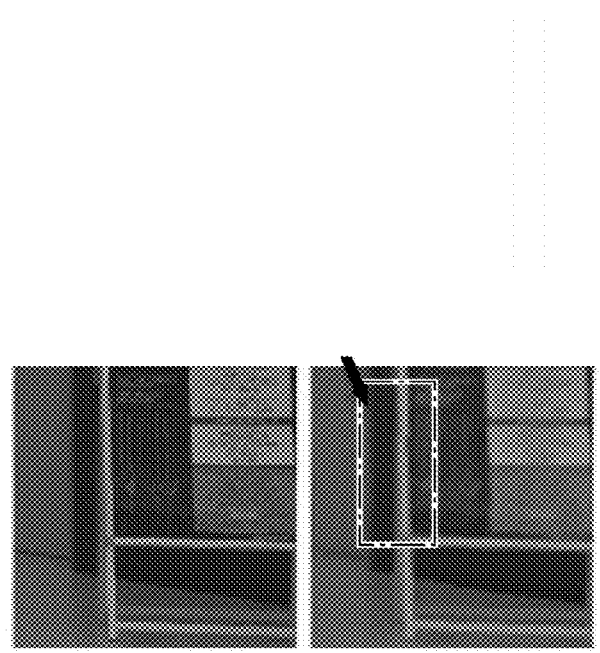

[Fig. 12]
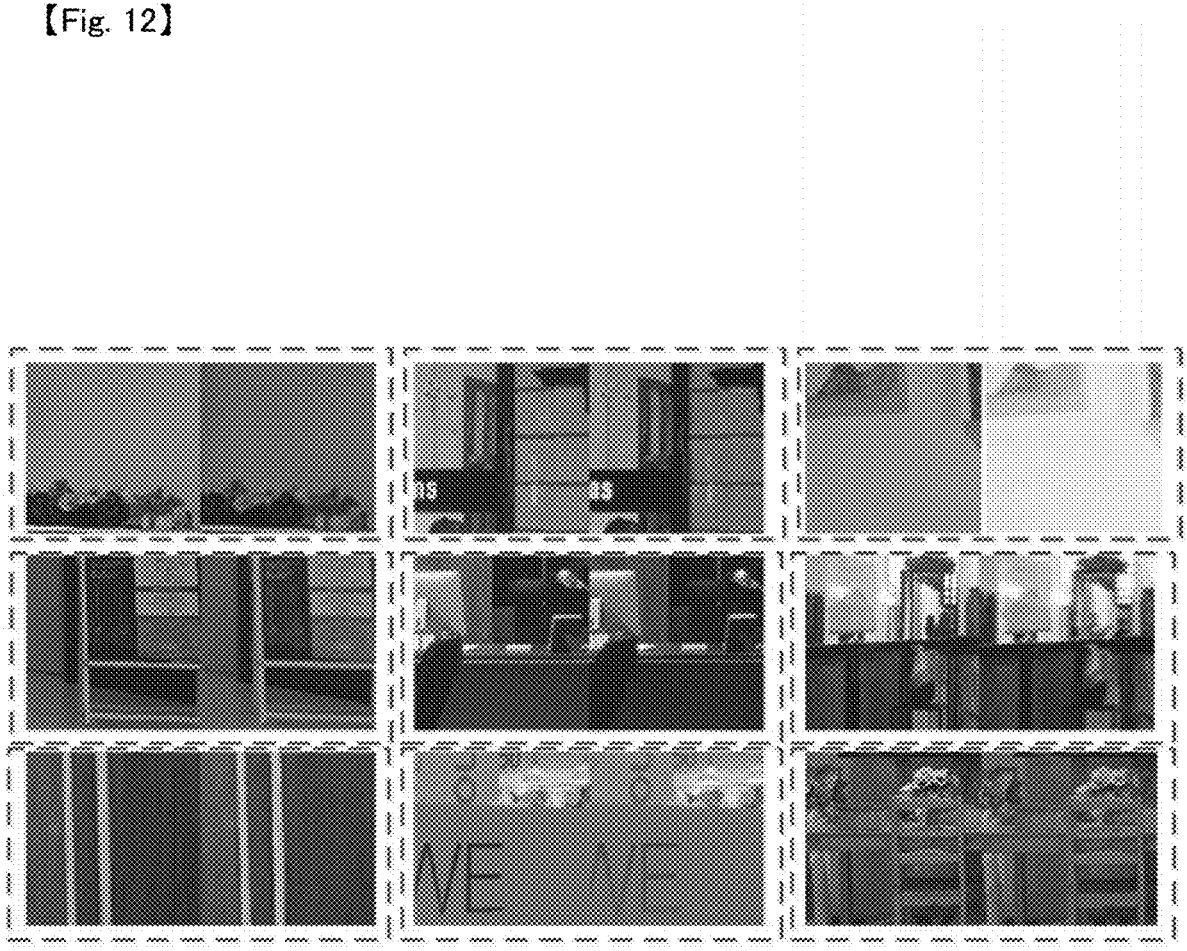

[Fig. 13]

[Fig. 14]

[Fig. 15]
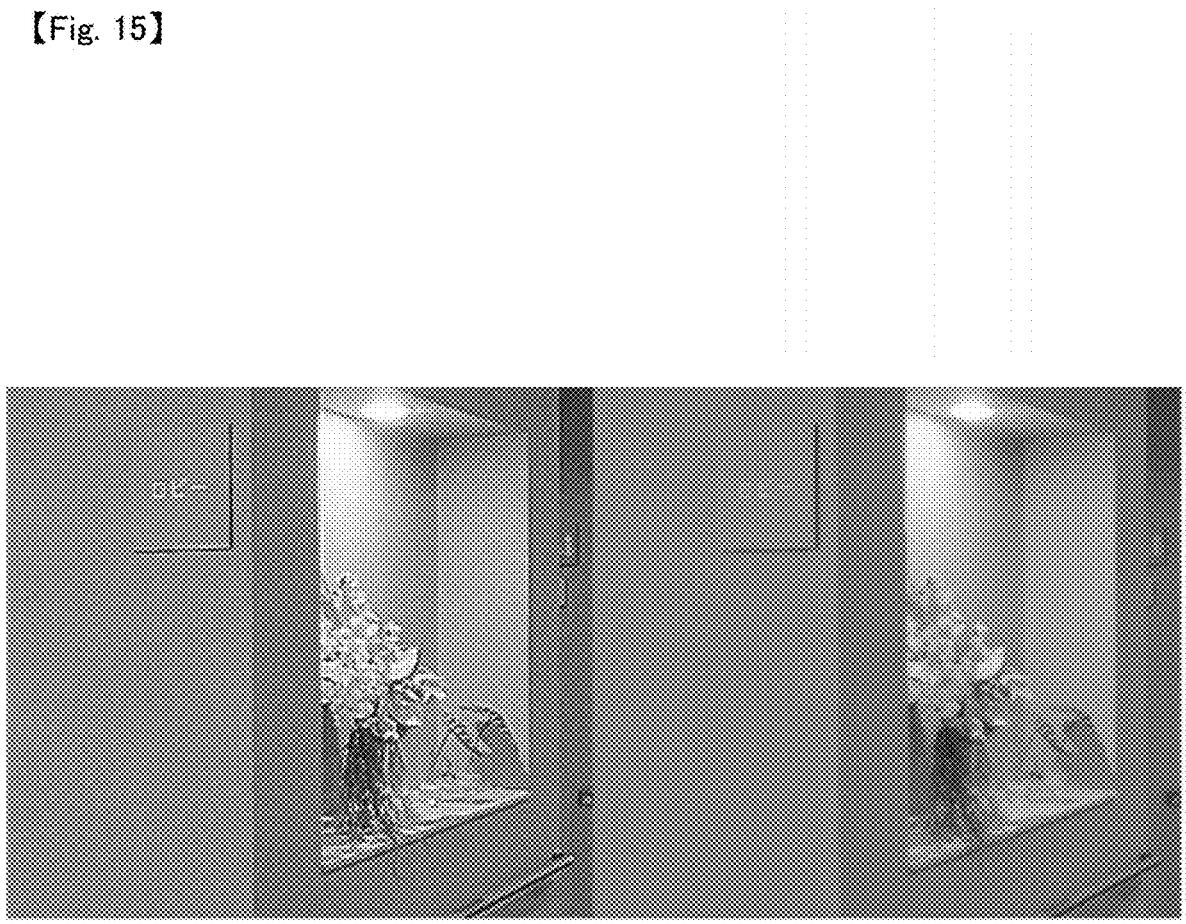

[Fig. 16]
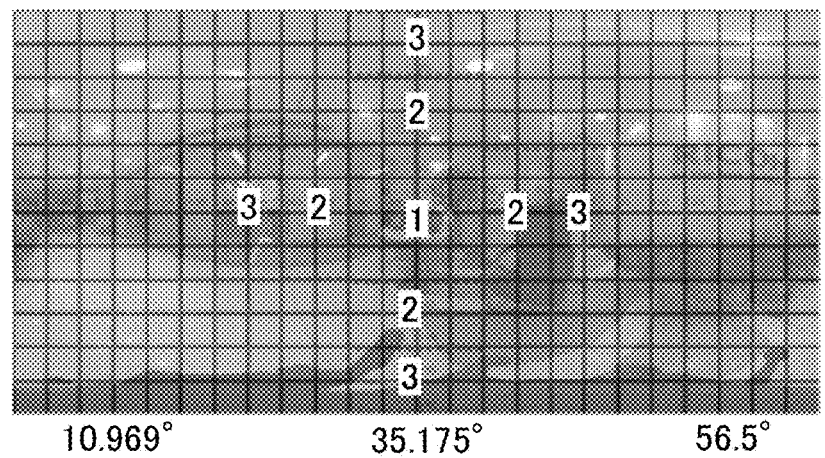

IMAGE ENHANCEMENT MODEL TRAINING DATA GENERATION FOR PANORAMIC IMAGES

CROSS-REFERENCE TO RELATED APPLICATIONS

The present application is a national phase under 35 U.S.C. § of PCT International Application No. PCT/JP2020/030707 which has an International filing date of Aug. 12, 2020, which is based on and claims the benefit of the priority of Chinese Patent Application No. 201910753276.X filed on Aug. 15, 2019, the entire contents of each of which are hereby incorporated by reference.

TECHNICAL FIELD

The present invention relates to the field of image processing, and especially relates to an image processing method and apparatus as well as a non-transitory computer-readable medium and a computer program.

BACKGROUND ART

A panoramic image taken by a panoramic camera usually has a field of view of 180 degrees or higher. However, compared to a planar image captured by a high-quality camera (such as a digital SLR (Single-Lens Reflex) camera), the panoramic image is poor in terms of sharpness, resolution, hue difference, etc.

SUMMARY OF INVENTION

Technical Problem

The aim of the present application is to provide an image processing method and apparatus as well as a non-transitory computer-readable medium and a computer program capable of improving the quality of an image.

Solution to Problem

According to a first aspect of the present invention, an image processing method is provided that includes steps of:
  obtaining a plurality of sets of training data, each set of training data containing data of a first image and data of a second image, the image quality of the second image being higher than that of the first image, the shooting contents of the first image being the same as shooting contents of the second image;
  constructing an image enhancement model, letting the data of the first image be an input of the image enhancement model, and utilizing the plurality of sets of training data to conduct training with respect to the image enhancement model until a difference feature value between an output of the image enhancement model and the data of the second image is minimum; and
  inputting data of a third image to be processed into the image enhancement model so as to output data of a fourth image after image enhancement, the image quality of the fourth image being higher than that of the third image.
Optionally, the first image is an equirectangular projection or a perspective view, and the second image is also an equirectangular projection or a perspective view.

Optionally, the obtaining a plurality of sets of training data includes steps of:
  fixing a panoramic camera at a first position, utilizing the panoramic camera to take a panoramic image, and converting the panoramic image into a perspective view;
  fixing a plane camera at a second position, rotating the plane camera to capture a plurality of planar images, and using the plurality of planar images to acquire a high-quality image corresponding to the perspective view, the plane camera being aligned with a non-parallel point(s) of the panoramic camera, the image quality of the high-quality image being higher than that of the perspective view, shooting contents of the high-quality image containing all shooting contents of the perspective view;
  determining a second area in the high-quality image corresponding to a first area in the perspective view, a position of the first area being matched with a position of the second area; and
  making use of the first area and the second area to procure N sets of images, each set of images containing the first image and the second image, N being an integer greater than 1.

Optionally, the making use of the first area and the second area to procure N sets of images includes steps of:
  dividing the second area into N second parts, any two adjacent second parts being not overlapping;
  dividing the first area into N first parts, any two adjacent first parts having an overlapping area;
  selecting an i-th second part from the N second parts and an i-th first part matching the i-th second part from the N first parts, shooting contents of the i-th first part containing shooting contents of the i-th second part, size of the i-th first part being greater than that of the i-th second part, i being an integer greater than and equal to 1 and less than or equal to N;
  performing pixel matching on the i-th second part and the i-th first part and utilizing the i-th first part to attain an i-th third part, size of the i-th third part being the same as the size of the i-th second part;
  calculating a matching accuracy of the i-th third part and the i-th second part and letting the i-th third part be the first image and the i-th second part be the second image if the matching accuracy is greater than a predetermined threshold; and
  if the matching accuracy is not greater than the predetermined threshold, adopting pattern matching to acquire an i-th fourth part matching the i-th second part from the i-th first part and letting the i-th fourth part serve as the first image and the i-th second part serve as the second image, size of the i-th fourth part being the same as the size of the i-th second part.

Optionally, the data of an image input into the image enhancement model includes at least one of semantic information and positional information of the image.

Optionally, a step of determining positional information of an image whose data is input into the image enhancement model is further involved. This step includes calculating a quality score of the image, determining an area identification corresponding to the quality score, and letting the area identification be the positional information.

Optionally, the image quality of the second image being higher than that of the first image includes at least one of:
  a case where resolution of the second image is greater than that of the first image;

a case where a signal-to-noise ratio of the second image is higher than that of the first image; and a case where hue difference of the second image is lower than that of the first image.

Optionally, the image enhancement model adopts any one of a convolutional neural network and a generative adversarial network.

According to a second aspect of the present invention, an image processing apparatus is provided which includes parts configured to:

obtain a plurality of sets of training data, each set of training data containing data of a first image and data of a second image, image quality of the second image being higher than that of the first image, shooting contents of the first image being the same as shooting contents of the second image;

construct an image enhancement model, let the data of the first image be an input of the image enhancement model, and utilize the plurality of sets of training data to conduct training with respect to the image enhancement model until a difference feature value between an output of the image enhancement model and the data of the second image is minimum; and input data of a third image to be processed into the image enhancement model so as to output data of a fourth image after image enhancement, image quality of the fourth image being higher than that of the third image.

According to a third aspect of the present invention, a non-transitory computer-readable medium is provided in which computer-executable instructions are stored. The computer-executable instructions, when executed by a processor, cause the processor to achieve the image processing method described above.

Advantageous Effects of Invention

By obtaining a plurality of sets of training data containing low-quality image data and high-quality image data and employing the plurality of sets of training data to conduct image enhancement model training, it is possible to acquire an image enhancement model capable of making image quality better. After that, by inputting the data of an image to be processed into the image enhancement model, it is possible to procure the data of the image with higher quality, thereby being able to ameliorate the quality of the image.

BRIEF DESCRIPTION OF DRAWINGS

FIG. 1 is a flowchart of an image processing method according to an embodiment of the present invention.

FIG. 2 is a flowchart of a process of obtaining a plurality of sets of training data.

FIG. 3 is a block diagram of an image processing apparatus in accordance with an embodiment of the present invention.

FIG. 4 is a block diagram of an electronic apparatus for image processing according to an embodiment of the present invention.

FIG. 5 is a flowchart of an image processing method in accordance with another embodiment of the present invention.

FIG. 6 illustrates exemplary images taken by a panoramic camera and a high-quality camera.

FIG. 7 illustrates a process of obtaining a perspective view and a high-quality image as well as first and second areas acquired based on the perspective view and the high-quality image.

FIG. 8 illustrates a pair of matched first and second image blocks serving as first and second image.

FIG. 9 illustrates a matching result.

FIG. 10 illustrates matched first and second areas as well as matched first and second images.

FIG. 11A illustrates a set of small image blocks obtained by adopting a pixel matching approach.

FIG. 11B illustrates a set of small image blocks acquired by employing a pattern matching approach.

FIG. 12 illustrates a plurality of sets of small image blocks.

FIG. 13 illustrates a low-quality image and its enhanced image.

FIG. 14 illustrates another low-quality image and its enhanced image.

FIG. 15 illustrates a comparison of performing enhancement on a low-quality image by using different approaches.

FIG. 16 illustrates an example of dividing an equirectangular projection into different areas.

DESCRIPTION OF EMBODIMENTS

In order to let a person skilled in the art better understand the present invention, hereinafter, the embodiments of the present invention will be concretely described with reference to the drawings. However, it should be noted that the same symbols, which are in the specification and the drawings, stand for constructional elements having basically the same function and structure, and the repetition of the explanations to the constructional elements is omitted.

As set forth, panoramic images taken by panoramic cameras usually have a field of view of 180 degrees or higher. However, compared to planar images captured by high-quality cameras (such as digital SLR cameras), the panoramic images are poor in terms of sharpness, resolution, hue difference, etc.

Image enhancement and super resolution (SR) may be used to improve the quality of a panoramic image. Image enhancement includes image sharpening, denoising, de-blurring, contrast enhancement, hue difference correction, etc. Image super resolution may make the quality of an image better by increasing the resolution of the image. However, conventional image enhancement and super resolution approaches have a limited effect on panoramic image quality improvement.

In order to solve the above-described problem, the embodiments of the present invention provide an image processing method and apparatus, an electronic apparatus for image processing, a computer-readable storage medium, and a computer program by which the quality of an image may be ameliorated.

First Embodiment

An image processing method is provided in this embodiment.

FIG. 1 is a flowchart of the image processing method.

As shown in FIG. 1, the image processing method is inclusive of STEPS S101 to S103.

In STEP S101, a plurality of sets of training data are obtained. Each set of training data contains the data of a first image and the data of a second image. The image quality of the second image is higher than that of the first image, and the shooting contents of the first image are the same as the shooting contents of the second image.

Here, both the first image and the second image may be an equirectangular projection or a perspective view; the first image may an equirectangular projection, and the second image may be a perspective view; or the first image may be a perspective view, and the second image may be an equirectangular projection. Of course, the first and second images are not limited to an equirectangular projection and/or a perspective view. That means they may be other types of images.

In order to obtain training data, it is possible to use cameras with different imaging qualities to shoot the same contents in advance. For example, a camera with high imaging quality may be utilized to photograph a content A so as to obtain a high-quality image, and then, a camera with low imaging quality may be adopted to shoot the same content A so as to acquire a low-quality image. Next, a matching process may be carried out with respect to the high-quality image and the low-quality image so as to procure a first image and a second image.

Parameters that measure image quality may include resolution, a signal-to-noise ratio, and hue difference. The image quality of the second image is higher than that of the first image. That means at least one of the following cases is involved, namely, a case where the resolution of the second image is greater than that of the first image; a case where the signal-to-noise ratio of the second image is higher than that of the first image; and a case where the hue difference of the second image is lower than that of the first image.

In an example, the camera with high imaging quality may adopt a plane camera such as a digital SLR camera, and the camera with low imaging quality may utilize a panoramic camera.

FIG. 2 is a flowchart of a process of obtaining a plurality of sets of training data.

As presented in FIG. 2, the process of obtaining a plurality of sets of training data contains STEPS S1011 to S1013.

In STEP S1011, a panoramic camera is fixed at a first position for capturing a panoramic image, and the panoramic image is converted into a perspective view. A plane camera is fixed at a second position, the plane camera being aligned with a non-parallel point(s) of the panoramic camera. A plurality of planar images is taken by rotating the plane camera, and a high-quality image corresponding to the perspective view is acquired by using the plurality of planar images. The image quality of the high-quality image is higher than that of the perspective view, and the shooting contents of the high-quality image contain all the shooting contents of the perspective view.

In STEP S1012, a second area in the high-quality image corresponding to a first area in the perspective view is determined. The position of the first area is matched with the position of the second area.

In STEP S1013, the first and second areas are utilized to acquire N sets of images. Each set of images includes a first image and a second image. Here, N is an integer greater than 1.

When using the first and second areas to attain the N sets of images, it is possible to divide the first area into N first parts and the second area into N second parts. There is an overlapping area (here, the width of the overlapping area is predetermined, and may be several pixels, for example) between any two adjacent first parts, but there is not an overlapping area between any two adjacent second parts. An i-th second part is selected from the N second parts, and an i-th first part matched with the i-th second part is chosen from the N first parts. The shooting contents of the i-th first part contain the shooting contents of the i-th second part, and the size of the i-th first part is greater than that of the i-th second part. Here, i is an integer greater than or equal to 1 and less than or equal to N. Next, pixel matching is performed on the i-th second part and the i-th first part, and an i-th third part is obtained by using the i-th first part. Here, the size of the i-th third part is the same as the size of the i-th second part. And then, a matching accuracy of the i-th third part and the i-th second part is calculated. If the matching accuracy is greater than a predetermined threshold, then the i-th third part serves as the first image, and the i-th second part serves as the second image. If the matching accuracy is not greater than the predetermined threshold, then an i-th fourth part matching the i-th second part is acquired from the i-th first part by utilizing a pattern matching process. In this case, the i-th fourth part serves as the first image, and the i-th second part serves as the second image. Here, the size of the i-th fourth part is the same as the size of the i-th second part.

It should be noted that it is possible to set a value range of the predetermined threshold according to actual needs. Specifically, a PSNR (Peak Signal-to-Noise Ratio) may be used to calculate the threshold. That is, an i-th part at the same position in the first and second images is utilized to calculate an original PSNR (expressed by PSNR_ori) of the two parts, and then, a matched PSNR value is calculated. If the matched PSNR value is less than PSNR_ori, then it is considered that the threshold requirement is not met.

Referring again to FIG. 1; STEP S102 is constructing an image enhancement model, letting the data of the first image be the input of the image enhancement model, and utilizing the plurality of sets training data to train the image enhancement model until the difference feature value between the output of the image enhancement model and the data of the second image is minimum.

Here, the image enhancement model may adopt a convolutional neural network or a generative adversarial network. The image enhancement model contains thousands of parameters. By inputting a low-quality image into the image enhancement model, it is possible to generate an enhanced image. A high-quality image serving as a reference image may be used to calculate the value of a loss function. The value of the loss function is continuously updated until the difference between the enhanced image and the reference image is minimum.

In order to improve the performance of the image enhancement model, the data of an image input into the image enhancement model may include information of the image such as semantic information, positional information, etc.

The positional information of the image may be determined as follows. First a quality score of the image is calculated, then an area identification corresponding to the quality score is determined which serves as the positional information.

Next, in STEP S103 of FIG. 1, the data of an image to be processed is input into the image enhancement model so as to output the data of a fourth image after image enhancement. The quality of the fourth image is higher than that of the third image.

Here, both the third image and the fourth image may be an equirectangular projection or a perspective view; the third image may be an equirectangular projection, and the fourth image may be a perspective view; or the third image may be a perspective view, and the fourth image may be an equirectangular projection. Of course, the third and fourth images are not limited to an equirectangular projection and/or a perspective view. That is, they may be other types of images.

After the third image is captured by a camera with low imaging quality, by inputting the data of the third image into the image enhancement model, it is possible to output the data of an enhanced image. And then, a fourth image may be produced on the basis of the data of the enhanced image. Here, the image quality of the fourth image is higher than that of the third image. In this way, the quality of an image may be ameliorated.

As depicted above, parameters that measure image quality may include resolution, a signal-to-noise ratio, and hue difference. The image quality of the fourth image is higher than that of the third image. That means at least one of the following cases is involved, namely, a case where the resolution of the fourth image is greater than that of the third image; a case where the signal-to-noise ratio of the fourth image is higher than that of the third image; and a case where the hue difference of the fourth image is lower than that of the third image.

In this embodiment, by acquiring a plurality of sets of training data containing low-quality image data and high-quality image data and making use of the plurality of sets of training data to carry out image enhancement model training, it is possible to attain an image enhancement model able to improve the quality of an image. After that, by inputting the data of an image waiting for processing into the image enhancement model, it is possible to obtain the data of the image with higher quality, thereby being capable of ameliorating the quality of the image.

Second Embodiment

In this embodiment, an image processing apparatus is described.

Here it should be noted that the image processing apparatus may execute the image processing method according to the first embodiment.

FIG. 3 is a block diagram of an image processing apparatus 20 according to this embodiment.

As presented in FIG. 3, three parts, i.e., an obtainment part 21, a construction part 22, and a processing part 23 are included in the image processing apparatus 20. Of course, the image processing apparatus 20 may further contain other parts. However, because these kinds of parts are not closely related to this embodiment, their illustrations and descriptions are omitted here for the sake of convenience.

In particular, the obtainment part 21, the construction part 22, and the processing part 23 may be configured to conduct STEPS S101 to S103 (shown in FIG. 1) of the image processing method according to the first embodiment. Here it should be noted that these steps have been minutely described in the image processing method according to the first embodiment. That is, for more information about STEPS S101 to S103, it is possible to see the first embodiment, wherefore the details of these steps are also omitted here for the sake of convenience.

In this embodiment, by obtaining a plurality of sets of training data including low-quality image data and high-quality image data and using the plurality of sets of training data to perform image enhancement model training, it is possible to acquire an image enhancement model able to make the quality of an image better. After that, by inputting the data of an image to be processed into the image enhancement model, it is possible to procure the data of the image with higher quality, thereby being capable of improving the quality of the image.

Third Embodiment

An electronic apparatus for image processing is provided in this embodiment.

FIG. 4 is a block diagram of an electronic apparatus 30 for image processing in accordance with this embodiment.

As shown in FIG. 4, the electronic apparatus 30 contains at least one processor 32 and a storage 34 connected to the processor 32.

Concretely, the processor 32 may be a CPU (Central Processing Unit) or any other processing part having data processing ability and/or instruction implementing ability, and may be configured to execute a computer program stored in the storage 34 so as to accomplish STEPS S101 to S103 of the image processing method according to the first embodiment whose details are omitted in this embodiment for the sake of convenience.

The storage 34 may be any storage medium for storing processor-readable computer programs, such as a floppy disk, a hard disk, a CD ROM, a magnetic tape device, or a solid state memory device.

In an example, as presented in FIG. 4, the storage 34 is inclusive of an operating system 341 and an application program 342. The operating system 341 may be any conventional type of operating system. The application program 342 may include a computer program for achieving the image processing method according to the first embodiment.

Additionally, the electronic apparatus 30 may further contain a network interface 31, an input device 33, a hard disk 35, and a display device 36, as shown in FIG. 4. These four parts may be the same as those in the prior art, for example.

In this embodiment, by acquiring a plurality of sets of training data containing low-quality image data and high-quality image data and making use of the plurality of sets of training data to carry out image enhancement model training, it is possible to attain an image enhancement model able to improve the quality of an image. After that, by inputting the data of an image waiting for processing into the image enhancement model, it is possible to obtain the data of the image having higher quality, thereby being capable of ameliorating the quality of the image.

Fourth Embodiment

In this embodiment, a computer program and a non-transitory computer-readable medium are briefly described as follows.

The computer program may cause a computer to conduct the image processing method in accordance with the first embodiment.

Furthermore, the non-transitory computer-readable medium may store computer-executable instructions (i.e., the computer program) for execution by a computer including a processor(s) or processing system. The computer-executable instructions, when executed, may render the processor(s) or processing system to perform the image processing method according to the first embodiment.

Fifth Embodiment

An image processing method is provided in this embodiment, which is based on the image processing method in accordance with the first embodiment.

FIG. 5 is a flowchart of the image processing method according to this embodiment.

In this embodiment, a panoramic camera is used to obtain a low-quality image, and a high-quality camera such as a digital SLR camera is utilized for acquiring a high-quality image.

As presented in FIG. 5, the image processing method in accordance with this embodiment includes STEPS S501 to S505.

In STEP S501, the panoramic camera is fixed at a first position, and a panoramic image is captured by the panoramic camera. The high-quality camera is fixed at a second position in a manner of being aligned with an NPP(s) (a Non-Parallel Point(s)) of the panoramic camera, and a plurality of planar images are taken by rotating the high-quality camera.

Here, the image quality of each planar image is higher than that of the panoramic image, and the sum of the shooting contents of the plurality of planar images needs to cover the shooting contents of the panoramic image.

An example is shown in FIG. 6 that illustrates exemplary images taken by a panoramic camera and a high-quality camera.

As presented in FIG. 6, the image 1 is a panoramic image taken by the panoramic camera, and the images 2 are high-quality images corresponding to different viewpoints of the panoramic camera, captured by rotating the high-quality camera 3 around the NPP(s). Particularly, the high-quality camera 3 may turn from left to right and from top to bottom so as to capture the high-quality images (i.e., the images 2) at different angles.

In STEP S502 of FIG. 5, the panoramic image is converted into a perspective view, and the plurality of planar images are utilized to procure a high-quality image corresponding to the perspective view. The image quality of the high-quality image is higher than that of the perspective view, and the shooting contents of the high-quality image contains all the shooting contents of the perspective view.

An example is presented in FIG. 7 that illustrates a process of obtaining a perspective view and a high-quality image as well as first and second areas acquired based on the perspective view and the high-quality image.

As shown in FIG. 7, the image 4 is a panoramic image (i.e., an equirectangular projection). The panoramic image may be converted into a perspective view (i.e., the image 5 in this drawing). The perspective view corresponds to the portion within the dotted frame in the panoramic image, and is a low-quality image. On the other hand, a plurality of planar images taken by a high-quality camera may be utilized to acquire a high-quality image (i.e., the image 6 in this drawing). The shooting contents of the high-quality image are the same as those of the perspective view, but the image quality of the high-quality image is significantly higher than that of the perspective view.

In STEP S503 of FIG. 5, a second area in the high-quality image corresponding to a first area in the perspective view is determined. The positions of the first area and the second area match. And then, N sets of images are obtained by making use of the first area and the second area. Each set of images includes a first image and a second image. Here, N is an integer greater than 1.

When carrying out training with respect to the image enhancement model, it necessary to acquire a plurality of sets of training data. The image enhancement model aims to utilize a low-quality image so as to output a high-quality image. As such, the training data of the image enhancement model needs to contain a plurality of sets of matched first and second images. The first image is taken from a low-quality image, the second image is taken from a high-quality image, and the shooting contents of the first image are the same as the shooting contents of the second image.

First it is necessary to match a first area in the perspective view with a second area in the high-quality image. The first area and the second area correspond to the same shooting contents. Then the first area is divided into a plurality of first image blocks, and the second area is also divided into a plurality of second image blocks in the same way. And then, a matching process is conducted with respect to the first image blocks in the first area and the second image blocks in the second area so as to output a pair of matched first and second image blocks serving as the first image and the second image.

For example, as presented in FIG. 7, the first area may be indicated by the image 7, and the second area may be indicated by the image 8.

FIG. 8 illustrates a pair of matched first and second image blocks serving as first and second image.

As shown in FIG. 8, the left image is a first image block, and the right image is a second image block which is matched with the first image block. The first image block is a low-quality image with distortion, i.e., the first image, and the second image block is a high-quality image, i.e., the second image.

In order to obtain a high-precision matching result, acquiring the first image and the second image matched with the first image includes two steps as follows. The first step is attaining a high-quality image and a low-quality image (a perspective view) after distortion correction, matching the high-quality image. The distortion-corrected low-quality image is extracted from an original low-quality panoramic image with distortion. The second step is using a block matching process to extract small image blocks (e.g., having a predetermined size) from the distortion-corrected low-quality image and the high-quality image. Here, it is possible to obtain matched first and second areas after the first step and matched small image blocks (i.e., the first image and the second image matched with the first image) after the second step 2.

For the original low-quality panoramic image with distortion and the high-quality image, after feature matching is succeeded and a corresponding viewing angle is found, the first and second areas whose positions match may be obtained.

FIG. 9 illustrates a matching result of the first step.

As shown in FIG. 9, the upper two images are a low-quality equirectangular projection (on the left side) and a high-quality image (on the right side), and the lower two images are matched first and second areas. The first area is extracted from the original low-quality panoramic image with distortion, and its distortion has been corrected.

FIG. 10 illustrates matched first and second areas as well as matched first and second images.

As presented in FIG. 10, the upper two images are the first and second areas whose positions match, and the lower two images are the matched first and second images. The first image is taken from the first area, the second image is taken from the second area, and both the first area and the first image are converted from an image having distortion. Compared to the upper two images, the lower two images have a smaller field of view. In general, the larger a field of view is, the more severe image distortion is. As a result, the distortion of a large image is more severe than that of a small image. In order to improve the matching accuracy, after acquiring the first and second areas whose positions match, the first and second areas may be respectively divided into a plurality of small image blocks so as to serving as the first and second images. In this way, it is possible to make an error, generated when converting an image having distortion into a perspective view, smaller.

When utilizing the first and second areas to acquire the first and second images, it is possible to divide the second area of the high-quality image into N small image blocks, and there is not an overlapping area between any two adjacent small image blocks. Here, N may be a positive integer; for example, N may be 9. Similarly, the first area matched with the second area also needs to be divided into N small image areas, but there is an overlapping area (here, the width of the overlapping area is predetermined, and may be several pixels, for example) between any two adjacent small blocks. Each small image block having high quality matches a corresponding small image block with low quality. An image block having high quality is output as the second image, and an image block with low quality, matching the image block having high quality is output as the first image matched with the second image. The entire matching process may include calculating a conversion matrix M and using the conversion matrix M to obtain a matched image after distortion correction and to finally acquire a matched large image having low quality.

When performing a matching process on the first image and the second image, first a small image block is selected from the second area of the high-quality image, and then, a small image block is also chosen from the corresponding position of the low-quality image. Here, the number of pixels of the small image block with low quality is a little bit (a predetermined number of pixels (e.g., several pixels) larger than that of the small image block having high quality. By performing pixel matching on these two small image blocks, it is possible to attain two matched small image blocks with of the same size. Next, the matching accuracy of this set of small images is determined. If the matching accuracy meets a predetermined requirement (e.g., greater than a predetermined threshold), then this set of small images is output; otherwise, a pattern matching algorithm is adopted to conduct a matching process with respect to the two small image blocks again so as to output a set of matched small image blocks. Here, the reason for choosing pixel matching first is that its matching effect is higher than that of pattern matching. However, if image features are not evenly distributed, pixel matching may result in distortion, whereas pattern matching may not. On the basis of this, if pixel matching is not suitable, then pattern matching may be used instead.

FIG. 11A illustrates a set of small image blocks obtained by adopting a pixel matching approach, and FIG. 11B illustrates a set of small image blocks acquired by employing a pattern matching approach.

If the distribution of image features is not uniform, then the pixel matching approach may result in distortion, and the pattern matching approach may result in misalignment. Although the effect of the pattern matching approach is not as good as that of the pixel matching approach, the pattern matching approach has little influence on the follow-on process. Consequently, it is possible to choose the pattern matching approach as a candidate solution when the pixel matching accuracy does not meet the predetermined requirement.

FIG. 12 illustrates a plurality of sets of small image blocks acquired after performing this step.

As presented in FIG. 12, each dotted frame embraces a set of small image blocks in which the left image is a high-quality image, i.e., a second image, and the right image is a low-quality image, i.e., a first image.

Referring to FIG. 5 again; in STEP S04, N sets of images are employed to train an image enhancement model.

In particular, the image enhancement model may adopt a neural network. The image enhancement model is a mapping model from low-quality image blocks to high-quality image blocks, and involves thousands of parameters. A low-quality image, i.e., the first image is input into the image enhancement model for generating an enhanced image, and a high-quality image, i.e., the second image is a real image for reference, and is used to calculate the value of a loss function. The value of the loss function is continuously updated until the difference between an enhanced image generated by the image enhancement model and the image for reference is minimum.

In order to utilize the image enhancement model to achieve super resolution, the obtained training data needs to satisfy a condition that the resolution of the second image is greater than that of the first image. Hence, the image enhancement model may learn a mapping model from low-resolution image blocks to high-resolution image blocks. A low-resolution image, i.e., the first image is input into the image enhancement model for generating a super resolution image, and a high-resolution image, i.e., a second image is a real image for reference, and is used to calculate the value of a loss function. The value of the loss function is continuously updated until the difference between an enhanced image generated by the image enhancement model and the image for reference is minimum.

Next, in STEP S505 of FIG. 5, the image enhancement model and a low-quality image are utilized to produce a high-quality image.

After the image enhancement model is trained, it is possible to input the data of a low-quality image to be processed into the image enhancement model so as to output high-quality image data, and utilize the high-quality image data to generate an image with high quality.

FIG. 13 illustrates a low-quality image and its enhanced image.

As shown in FIG. 13, on the left side is the low-quality equirectangular projection (which is captured indoors) waiting for processing, and on the right side is the enhanced image obtained by using the technical solution according to this embodiment. It is obvious from this drawing that the image quality is improved.

FIG. 14 also illustrates a low-quality image and its enhanced image.

As presented in FIG. 14, the image on the left side is the low-quality equirectangular projection (which is captured outdoors) to be processed, and the image on the right side is the enhanced image acquired by utilizing the technical solution according to this embodiment. It is apparent from FIG. 14 that image quality is ameliorated.

FIG. 15 illustrates a comparison of performing enhancement on a low-quality image by using different approaches.

As shown in FIG. 15, a result of processing the image with low quality by using a sharpen filter is on the left side, and a result of processing the image with low quality by utilizing the technical solution in accordance with this embodiment is on the right side. It is obvious from this drawing that it is possible to improve the image quality using the technical solution according to this embodiment, compared to using the sharpen filter.

Additionally, in order to better improve the image quality, when conducting training with respect to the image enhancement model, image data input into the image enhancement model may include the positional information of an image. Specifically, it is possible to let angles of view corresponding to a pair of small images in the related panoramic image serve as the positional information, then use a one hot vector to define the positional information, and then, link it to the generator (G) and the discriminator (D) of the image enhancement model.

FIG. 16 illustrates an example of dividing an equirectangular projection into different areas.

As presented in FIG. 16, it is possible to divide an equirectangular projection into different areas according to different image qualities. In this drawing, the equirectangular projection is divided into three areas. Each area having the same number (i.e., 1, 2, or 3) has the same image quality, and its corresponding angle is shown below the equirectangular projection.

It is possible to determine, by calculating quality scores of small image blocks, an area to which a pair of small image blocks belong. For example, PSNRs (Peak Signal-to-Noise Ratios) and/or SSIM (Structural SIMilarity) indices of small image blocks may be calculated to serve as the quality scores. If a quality score is greater than or equal to a first threshold, then the related pair of small image blocks may be determined as belonging to area 1, and has the best image quality. If the quality score is greater than and equal to a second threshold but less than the first threshold, then the related pair of small image blocks may be determined as belonging to area 2, and has better image quality. If the quality score is greater than and equal to a third threshold but less than the second threshold, then the related pair of small image blocks may be determined as belonging to area 3, and has the worst image quality. Area identifications corresponding to small image blocks may serve as the pieces of positional information of the small image blocks.

Moreover, in order to further ameliorate the image quality, when performing training on the image enhancement model, image data input into the image enhancement model may include the semantic information of an image in addition to the positional information of the image. For example, it is possible to divide, according to different pieces of semantic information, an equirectangular projection into different areas such as sky, tree, and grass. When training the image enhancement model, the semantic information corresponding to an image block is also input into the image enhancement model.

By taking advantage of the technical solution in accordance with this embodiment, the image quality of a panoramic image may be improved to be equivalent to the image quality of a corresponding planar image captured by a SLR camera.

Furthermore, in this embodiment, the first image adopts an equirectangular projection, and the second image uses a perspective view. However, the technical solution according to this embodiment is not limited to this. For example, the first image may use a perspective view, and the second image may adopt an equirectangular projection. In this case, it is necessary to convert a high-quality image taken by a high-quality camera into an equirectangular projection so as to serve as the source of the second image.

Here it should be noted that the embodiments of the present invention may be implemented in any convenient form, for example, using dedicated hardware or a mixture of dedicated hardware and software. The embodiments of the present invention may be implemented as computer software executed by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Because the embodiments of the present invention can be implemented as software, each and every aspect of the present invention thus encompasses computer software implementable on a programmable device.

The computer software may be provided to the programmable device using any storage medium for storing processor-readable codes such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but various modifications could be made thereto by a person skilled in the art without departing from the basic concept and technical scope of the present invention.

The present application is based on and claims the benefit of the priority of Chinese Patent Application No. 201910753276.X filed on Aug. 15, 2019, the entire contents of which are hereby incorporated by reference.

The invention claimed is:

1. An image processing method comprising:
    obtaining a plurality of sets of training data, each set of training data containing data of a first image and data of a second image, image quality of the second image being higher than that of the first image, shooting contents of the first image being the same as shooting contents of the second image;
    constructing an image enhancement model, letting the data of the first image be an input of the image enhancement model, and utilizing the plurality of sets of training data to conduct training with respect to the image enhancement model until a difference feature value between an output of the image enhancement model and the data of the second image reaches a minimum; and
    inputting data of a third image to be processed into the image enhancement model so as to output data of a fourth image after image enhancement, image quality of the fourth image being higher than that of the third image,
    wherein, the obtaining a plurality of sets of training data includes:
    fixing a panoramic camera at a first position, using the panoramic camera to take a panoramic image, and converting the panoramic image into a perspective view;
    fixing a plane camera at a second position, rotating the plane camera to capture a plurality of planar images, and utilizing the plurality of planar images to acquire a high-quality image corresponding to the perspective view, the plane camera being aligned with a non-parallel point(s) of the panoramic camera, image quality of the high-quality image being higher than that of the perspective view, shooting contents of the high-quality image containing all shooting contents of the perspective view;

determining a second area in the high-quality image corresponding to a first area in the perspective view, a position of the first area being matched with a position of the second area; and using the first area and the second area to attain N sets of images, each set of images containing the first image and the second image, N being an integer greater than 1.

2. The image processing method according to claim 1, wherein, the first image is an equirectangular projection or a perspective view, and the second image is also an equirectangular projection or a perspective view.

3. The image processing method according to claim 1, wherein, the using the first area and the second area to attain N sets of images includes:

dividing the second area into N second parts, any two adjacent second parts being not overlapping;

dividing the first area into N first parts, any two adjacent first parts having an overlapping area;

selecting an i-th second part from among the N second parts and an i-th first part matching the i-th second part from among the N first parts, shooting contents of the i-th first part containing shooting contents of the i-th second part, size of the i-th first part being greater than that of the i-th second part, i being an integer greater than and equal to 1 and less than or equal to N;

performing pixel matching on the i-th second part and the i-th first part and utilizing the i-th first part to procure an i-th third part, size of the i-th third part being the same as the size of the i-th second part;

calculating a matching accuracy of the i-th third part and the i-th second part and letting the i-th third part be the first image and the i-th second part be the second image if the matching accuracy is greater than a predetermined threshold; and in a case where the matching accuracy is not greater than the predetermined threshold, adopting pattern matching to acquire an i-th fourth part matching the i-th second part from the i-th first part and letting the i-th fourth part serve as the first image and the i-th second part serve as the second image, size of the i-th fourth part being the same as the size of the i-th second part.

4. The image processing method according to claim 1, wherein, data of an image input into the image enhancement model includes at least one of:

semantic information, positional information of the image, or any combinations thereof.

5. The image processing method according to claim 4, further comprising:

determining the positional information of the image, wherein, the determining the positional information of the image includes, calculating a quality score of the image, determining an area identification corresponding to the quality score, and letting the area identification be the positional information.

6. The image processing method according to claim 1, wherein, the image quality of the second image being higher than that of the first image includes at least one of:

a case where resolution of the second image is greater than that of the first image;

a case where a signal-to-noise ratio of the second image is higher than that of the first image;

a case where hue difference of the second image is lower than that of the first image; or any combinations thereof.

7. The image processing method according to claim 1, wherein, the image enhancement model adopts any one of a convolutional neural network, a generative adversarial network, or any combinations thereof.

8. An electronic apparatus for image processing, comprising:

at least one storage device configured to store computer-executable instructions; and at least one processor coupled to the storage device, wherein the computer-executable instructions, when executed, cause the at least one processor to implement the image processing method according to claim 1.

9. A non-transitory computer-readable medium storing computer-executable instructions for execution by at least one processor, wherein, the computer-executable instructions, when executed, cause the at least one processor to carry out the image processing method according to claim 1.

10. An image processing apparatus comprising:

memory storing computer readable instructions; and at least one processor configured to execute the computer readable instructions to, obtain a plurality of sets of training data, each set of training data containing data of a first image and data of a second image, image quality of the second image being higher than that of the first image, shooting contents of the first image being the same as shooting contents of the second image;

construct an image enhancement model, input the data of the first image into the image enhancement model, and utilize the plurality of sets of training data to conduct training with respect to the image enhancement model until a difference feature value between an output of the image enhancement model and the data of the second image reaches a minimum; and input data of a third image to be processed into the image enhancement model so as to output data of a fourth image after image enhancement, image quality of the fourth image being higher than that of the third image, wherein, the obtaining a plurality of sets of training data includes:

fixing a panoramic camera at a first position, using the panoramic camera to take a panoramic image, and converting the panoramic image into a perspective view;

fixing a plane camera at a second position, rotating the plane camera to capture a plurality of planar images, and utilizing the plurality of planar images to acquire a high-quality image corresponding to the perspective view, the plane camera being aligned with a non-parallel point(s) of the panoramic camera, image quality of the high-quality image being higher than that of the perspective view, shooting contents of the high-quality image containing all shooting contents of the perspective view;

determining a second area in the high-quality image corresponding to a first area in the perspective view, a position of the first area being matched with a position of the second area; and using the first area and the second area to attain N sets of images, each set of images containing the first image and the second image, N being an integer greater than 1.

11. The image processing apparatus according to claim 10, wherein
the first image is an equirectangular projection or a perspective view; and
the second image is also an equirectangular projection or a perspective view.

12. The image processing apparatus according to claim 10, wherein the at least one processor is further configured to execute the computer readable instruction to use the first area and the second area to attain N sets of images by:
dividing the second area into N second parts, any two adjacent second parts being not overlapping;
dividing the first area into N first parts, any two adjacent first parts having an overlapping area;
selecting an i-th second part from among the N second parts and an i-th first part matching the i-th second part from among the N first parts, shooting contents of the i-th first part containing shooting contents of the i-th second part, size of the i-th first part being greater than that of the i-th second part, i being an integer greater than and equal to 1 and less than or equal to N;
performing pixel matching on the i-th second part and the i-th first part and utilizing the i-th first part to procure an i-th third part, size of the i-th third part being the same as the size of the i-th second part;
calculating a matching accuracy of the i-th third part and the i-th second part and letting the i-th third part be the first image and the i-th second part be the second image if the matching accuracy is greater than a predetermined threshold; and
in a case where the matching accuracy is not greater than the predetermined threshold, adopting pattern matching to acquire an i-th fourth part matching the i-th second part from the i-th first part and letting the i-th fourth part serve as the first image and the i-th second part serve as the second image, size of the i-th fourth part being the same as the size of the i-th second part.

13. The image processing apparatus according to claim 10, wherein, data of an image input into the image enhancement model includes at least one of:
semantic information, positional information of the image, or any combinations thereof.

14. The image processing apparatus according to claim 13, wherein the at least one processor is further configured to execute the computer readable instruction to:
determine the positional information of the image, the determining the positional information of the image including,
calculating a quality score of the image, determining an area identification corresponding to the quality score, and letting the area identification be the positional information.

15. The image processing apparatus according to claim 10, wherein the image quality of the second image being higher than that of the first image includes at least one of:
a case where resolution of the second image is greater than that of the first image;
a case where a signal-to-noise ratio of the second image is higher than that of the first image;
a case where hue difference of the second image is lower than that of the first image; or
any combinations thereof.

16. The image processing apparatus according to claim 10, wherein the image enhancement model adopts any one of a convolutional neural network, a generative adversarial network, or any combinations thereof.

* * * * *